(12) United States Patent
Shimizu et al.

(10) Patent No.: US 6,690,465 B2
(45) Date of Patent: Feb. 10, 2004

(54) METHOD AND APPARATUS FOR MEASURING SPECTRAL IRRADIANCE DISTRIBUTION

(75) Inventors: Masayoshi Shimizu, Kawasaki (JP); Masahiro Mori, Kawasaki (JP); Shoji Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 287 days.

(21) Appl. No.: 09/752,397

(22) Filed: Jan. 3, 2001

(65) Prior Publication Data

US 2001/0024274 A1 Sep. 27, 2001

(30) Foreign Application Priority Data

Mar. 10, 2000 (JP) ........................................ 2000-067517

(51) Int. Cl.⁷ ............................... G01J 3/40; G01J 3/42; G01J 3/28
(52) U.S. Cl. ......................... 356/326; 356/303; 356/319
(58) Field of Search ................................ 356/303, 319, 356/326

(56) References Cited

U.S. PATENT DOCUMENTS 5,625,452 A * 4/1997 Hasson ........................ 356/326
5,731,874 A * 3/1998 Maluf ........................... 356/326

FOREIGN PATENT DOCUMENTS

JP     11-132853     5/1999

OTHER PUBLICATIONS

The CIE Colorimetric System, Second edition, pp. 143–146 & 156–164, 1982.
Optical Society of America, vol. 13, No. 11, pp. 2163–2173, Nov. 1966.
Electrotechnical Laboratory, vol. 35, No. 12, pp. 26–46, 1971.
Analytical Chemistry, vol. 45, pp. 553–557, Mar. 1973.
Measuring Colour, Third Edition, pp. 265–267, 1998.
Journal of Photographic Science and Technology Society of Japan, vol. 36, No. 5, 1973—English Abstract only.
Journal of Photographic Science and Technology Society of Japan, vol. 38, No. 6, 1975—English Abstract only.
Estimation of Number and Spectral Characteristics of Component Dyes by Principal Component Analysis (1) Two Component System, by Noboru Ohta and Koji Takahashi.
Estimation of Number and Spectral Characteristics of Component Dyes by Principal Component Analysis (111) Multi–Component System, Koji Takahashi and Noboru Ohta.

* cited by examiner

*Primary Examiner*—Rodney Fuller
(74) *Attorney, Agent, or Firm*—Armstrong, Kratz, Quintos, Hanson & Brooks, LLP.

(57) ABSTRACT

In measuring a spectral irradiance distribution of light, light is irradiated to n (natural number) light-transit sections, which respectively have n kinds of given optical characteristic coefficients, and s (natural number) optical sensors, which respectively have s kinds of given spectral sensitivities, receive the light via the n light-transit sections and detects individual responses for the received light. Then a calculating section calculates m (natural number) spectral irradiances for m kinds of wavelengths as a spectral irradiance distribution based on linear formulae established between the optical characteristic coefficients, the spectral sensitivities, (n×s) responses for the light obtained by the s optical sensors, and the spectral irradiance distribution of the light.

52 Claims, 9 Drawing Sheets

METHOD AND APPARATUS FOR MEASURING SPECTRAL IRRADIANCE DISTRIBUTION

BACKGROUND OF THE INVENTION

1. Field of the Invention

The present invention relates to a method and an apparatus which are suitable for use in measuring a spectral irradiance distribution.

2. Description of the Related Art

When a computer, such as a personal computer (PC, hereinafter also called the computer) processes a color image, such as editing a color image captured into the computer using a scanner while checking the color image displayed on the monitor, or printing a color image using a color printer, colors of an object for processing have to be accurately calculated by the computer.

Generally, the basic colors of an object are expressed in the form of tristimulas XYZ values of the light reflected from the object (Günter Wyszecki and W. S. Stiles, "Color Science: Concepts and Methods, Quantitative Data and Formulae Second Edition, 3.3.8 Calculation of CIE Tristimulus Values and Chromaticity Coordinates", John Wiley & Sons, Inc. (1982)). Accurate calculation of tristimulas XYZ values requires the spectral irradiance distribution of light irradiating the object.

A spectral irradiation distribution is a physical value indispensable for accurate processing of a color image. For example, tristimulas XYZ values are essential factors to estimate a print image to be printed by the printing machine.

The conventional method of measuring a spectral irradiance of the light irradiating a particular surface is exemplified by a method of dividing into spectral distributions by a spectral filter, and measuring the respective spectral irradiance distributions of the individual spectral distributions by a plurality of photosensitive sensors in accordance with various wavelengths of the spectral distributions. This spectral irradiance distribution measurement is performed by a dedicated apparatus.

However, such conventional apparatus has to be equipped with these photosensitive sensors having different optical sensitivities as many as the number of the wavelengths by which the measurement is performed. As a result, the conventional apparatus is complicated and very expensive due to the increased number of the photosensitive sensors.

As spectral irradiance distribution measuring method using photosensitive sensors whose number is less than that of the measuring bands are disclosed in (1) Shoji Tominaga, "Multichannel Vision System for Estimating Surface and Illumination Functions", J. Opt. Soc. Am. A, Vol. 13, No. 11, 2163–2173 (November 1996), in which a spectral irradiance distribution of the light irradiating an object is measured as shown in FIG. 9, and (2) Japanese Laid-Open (Kokai) Publication No. HEI 11–132853, in which a spectral irradiance distribution of a light source is directly measured as shown in FIG. 10.

These two conventional methods will now be described more with reference to FIGS. 9 and 10.

(1) Method of measuring a spectral irradiance distribution of light irradiating an object:

With this conventional method of FIG. 9, the spectral irradiance distribution of the light irradiates an object 183 (irradiating light), whose spectral reflectance is not given, from a light source 180 and the spectral reflectance are calculated. At that time, the object 183 is photographed by a 6-band camera 182, which has sensitivity to 6 colors of RGB colors (red, green, blue) and to the other three colors, and then the spectral irradiance distribution of the irradiating light and spectral reflectance of the object 183 are measured based on the photographed image.

Since unknown coefficients and numbers upon the measurement are many, special equipment called the 6-band camera 182 is used. Further, the measurable spectral irradiation distribution of irradiating light is limited to such range so as to expressed by a linear combination of three components.

(2) Method of measuring a spectral irradiance distribution of a light source directly:

In this conventional apparatus of FIG. 10, plural optical filters 281 respectively having different spectral transmittances are individually disposed on the irradiating path of a light source 280 emitting light to measure emitting light thereof. The plural sensors 282 respectively installed in accordance with the individual optical filters 281 so as to receive the light transmitted through the optical filters 281. As a result, a spectral irradiance distribution of the light is estimated referring to the spectral transmittances of the optical filters 281.

Subsequently, outputs from the optical sensors 282 are converted into voltage values by an amplifier and then are further converted into digital data by an A/D converter to calculate the spectral irradiance distribution and chromatic characteristic the light source 280 in terms of the digital data on a computer.

However, the above-mentioned conventional methods have the following problems:

One method of FIG. 9 requires special equipment of 6-band camera, and a measurable spectral irradiation distribution of irradiating light is limited to such a range so as to be expressed by a linear combination of three components. Generally, indoor light sources are various types, many of which are complicated. Therefore it is practically difficult that all types of indoor light sources are measured under the same restriction that a spectral irradiation distribution is measured within a range such as to be expressed by a linear combination of three components.

In the other method of FIG. 10, the spectral irradiance distribution of the light source 280 is directly measured. It is impossible to measure the spectral irradiance distribution of the light irradiating an object surface. And there is a significant restriction that a spectral irradiance distribution of only light sources very similar in spectral irradiance distribution to a single predetermined light source.

Accordingly, with either these two conventional methods, it is difficult to measure a spectral irradiance distribution of light irradiating an object surface without using any expensive measuring equipment.

SUMMARY OF THE INVENTION

With the foregoing problems in view, it is an object of the present invention to provide a method of measuring a spectral irradiance distribution of light irradiating an object surface without using expensive measuring equipment. Another object of the invention is to provide an apparatus for carrying out the above-mentioned method.

In order to attain the above first-named object, according to a first generic feature of the present invention, there is provided a method of measuring a spectral irradiance distribution of light, comprising the steps of: receiving the light on s (natural number) optical sensors, which respectively have s kinds of given spectral sensitivities, via n (natural number) light-transit sections, which respectively have n kinds of given optical characteristic coefficients; detecting individual responses for the light (receiving irradiances of the light), which is received via the n light-transit sections, by each and every one of the s optical sensors, and obtaining (n×s) responses for the received light; and calculating m (natural number) spectral irradiances for m kinds of wavelengths as a spectral irradiance distribution of the light, based on one or more linear formulae established between the optical characteristic coefficients, the spectral sensitivities, the (n×s) receiving irradiances, and the spectral irradiance distribution of the light. With this method, it is possible to calculate a spectral irradiance distribution of light with ease and to make the apparatus simple in construction with the reduced number of the optical sensors.

As a preferable feature, the optical sensors and the light-transit sections are arranged in such a manner that the number (n×s) of the responses for the light detected by the optical sensors is equal to or larger than the number (m) of the spectral irradiances to be calculated based on the linear formulae; and the m spectral irradiances are calculated by directly solving the linear formulae. With this preferable feature, it is possible to solve the one or more linear formulae improving the reliability of the solutions of the linear formulae.

As another preferable feature, the optical sensors and the light-transit sections are arranged in such a manner that the number (n×s) of the responses for the light detected by the optical sensors is smaller than the number (m) of the spectral irradiances to be calculated based on the linear formulae; and the m spectral irradiances are calculated by solving the linear formulae under a predetermined constraint. With this preferable feature, it is possible to make the apparatus simple in construction with the reduced number of the optical sensors and to improve the reliability of the solutions of the linear formulae.

As still another preferable feature, the predetermined constraint is such that the spectral irradiance distribution of the light is a positive value, or is expressed by a linear combination of predetermined spectral irradiance distributions. With this preferable feature, it is possible to solve the linear formulae with ease and to improve the reliability of the solution of the linear formulae.

As a further preferable feature, another constraint is added to the predetermined constraint, the another constraint being such that: the spectral irradiance distribution of the light is a positive value; and the spectral irradiance distribution of the light is expressed by linearly combining the predetermined spectral irradiance distribution with a non-negative coefficient. With this preferable feature, it is possible to improve the reliability of the solutions the linear formulae.

As a still further preferable feature, the predetermined spectral irradiance distribution is a principal component of estimated spectral irradiance distributions of light sources, or is a linear combination with principal components of estimated spectral irradiance distributions of light sources, or is an estimated spectral irradiance of a light source. With this preferable feature, it is possible to improve the reliability of the solutions the linear formulae.

As an additional preferable feature, the method further comprises: preparing a plurality of sets of the predetermined spectral irradiance distributions; calculating the spectral irradiance distributions of the light respectively using the prepared plural sets of spectral irradiance distributions; and selecting, among a plurality of the calculated spectral irradiance distributions of light, one spectral irradiance distribution whose error in the linear formulae is minimal. With this preferable feature, it is possible to obtain a reliable spectral irradiance distribution.

As still another preferable feature, the light-transit selection is a reflector which reflects the light; the optical characteristic coefficient is a spectral reflectance of the reflector; and the receiving irradiance of the light reflected from the reflector is detected by the optical sensors. With this preferable feature, it is possible to make the apparatus simple in construction.

As a still further preferable feature, the light-transit selection is a filter which allows the light to transmit therethrough; the optical characteristic coefficient is a spectral transmittance of the filter; and the receiving irradiance of the light transmitted through the filter is detected by the optical sensors. With this preferable feature, it is possible to make the apparatus simple in construction.

In order to attain the above second-named object, according to a second generic feature of the present invention, there is provided an apparatus for measuring a spectral irradiance distribution of light, comprising: n (natural number) light-transit sections to which the light is to be irradiated, the n light-transit sections respectively having n kinds of given optical characteristic coefficients; s (natural number) optical sensors for detecting individual responses for the light received via the n light-transit sections, the s optical sensors respectively having s kinds of given spectral sensitivities; and a calculating section for calculating m (natural number) spectral irradiances for each and every one of m kinds of wavelengths as a spectral irradiance distribution of the light based on one or more linear formulae established between the optical characteristic coefficients, the spectral sensitivities, (n×s) receiving irradiances obtained by the s optical sensors, and the spectral irradiance distribution. With this apparatus, it is possible to calculate a spectral irradiance distribution of light with ease and to make the apparatus simple in construction with the reduced number of the optical sensors.

As a preferable feature, the optical sensors and the light-transit sections are arranged in such a manner that the number (n×s) of the responses for the light detected by the optical sensors is equal to or larger than the number (m) of the spectral irradiances to be calculated based on the linear formulae; and the m spectral irradiances are calculated by directly solving the linear formulae. With this preferable feature, it is possible to solve the one or more linear formulae improving the reliability of the solutions of the linear formulae.

As another preferable feature, the optical sensors and the light-transit sections are arranged in such a manner that the number (n×s) of the responses for the light detected by the optical sensors is smaller than the number (m) of the spectral irradiances to be calculated based on the linear formulae; and the m spectral irradiances are calculated by solving the linear formulae under a predetermined constraint. With this preferable feature, it is possible to make the apparatus simple in construction with the reduced number of the optical sensors and to improve the reliability of the solutions of the linear formulae.

As still another preferable feature, the predetermined constraint is such that the spectral irradiance distribution of the light is a positive value, or is expressed by a linear combination of predetermined spectral irradiance distributions. With this preferable feature, it is possible to solve the linear formulae with ease and to improve the reliability of the solution of the linear formulae.

As a further preferable feature, another constraint is added to the predetermined constraint, the another constraint being such that: the spectral irradiance distribution of the light is a positive value; and the spectral irradiance distribution of the light is expressed by linearly combining the predetermined spectral irradiance distribution with a non-negative coefficient. With this preferable feature, it is possible to improve the reliability of the solutions the linear formulae.

As a still further preferable feature, the predetermined spectral irradiance distribution is a principal component of estimated spectral irradiance distributions of light sources, or is a linear combination with principal components of estimated spectral irradiance distributions of light sources, or is an estimated spectral irradiance of a light source. With this preferable feature, it is possible to improve the reliability of the solutions the linear formulae.

As an additional further preferable feature, the apparatus further comprises: preparing a plurality of sets of the predetermined spectral irradiance distributions; calculating the spectral irradiance distributions of the light respectively using the prepared plural sets of spectral irradiance distributions; and selecting, among a plurality of the calculated spectral irradiance distributions of light, one spectral irradiance distribution whose error in the linear formulae is minimal. With this preferable feature, it is possible to obtain a reliable spectral irradiance distribution.

As still another preferable feature, the light-transit selection is a reflector which reflects the light; the optical characteristic coefficient is a spectral reflectance of the reflector; and the receiving irradiance of the light reflected from the reflector is detected by the optical sensors. With this preferable feature, it is possible to make the apparatus simple in construction.

As a still further preferable feature, the light-transit selection is a filter which allows the light to transmit therethrough; the optical characteristic coefficient is a spectral transmittance of the filter; and the receiving irradiance of the light transmitted through the filter is detected by the optical sensors. With this preferable feature, it is possible to make the apparatus simple in construction.

Other objects and further features of the present invention will be apparent from the following detailed description when read in conjunction with the accompanying drawings.

DESCRIPTION OF THE PREFERRED EMBODIMENTS

Preferred embodiments of the present invention will now be described with reference to the accompanying drawings.

(A) Principles of the Invention

Figure 1:
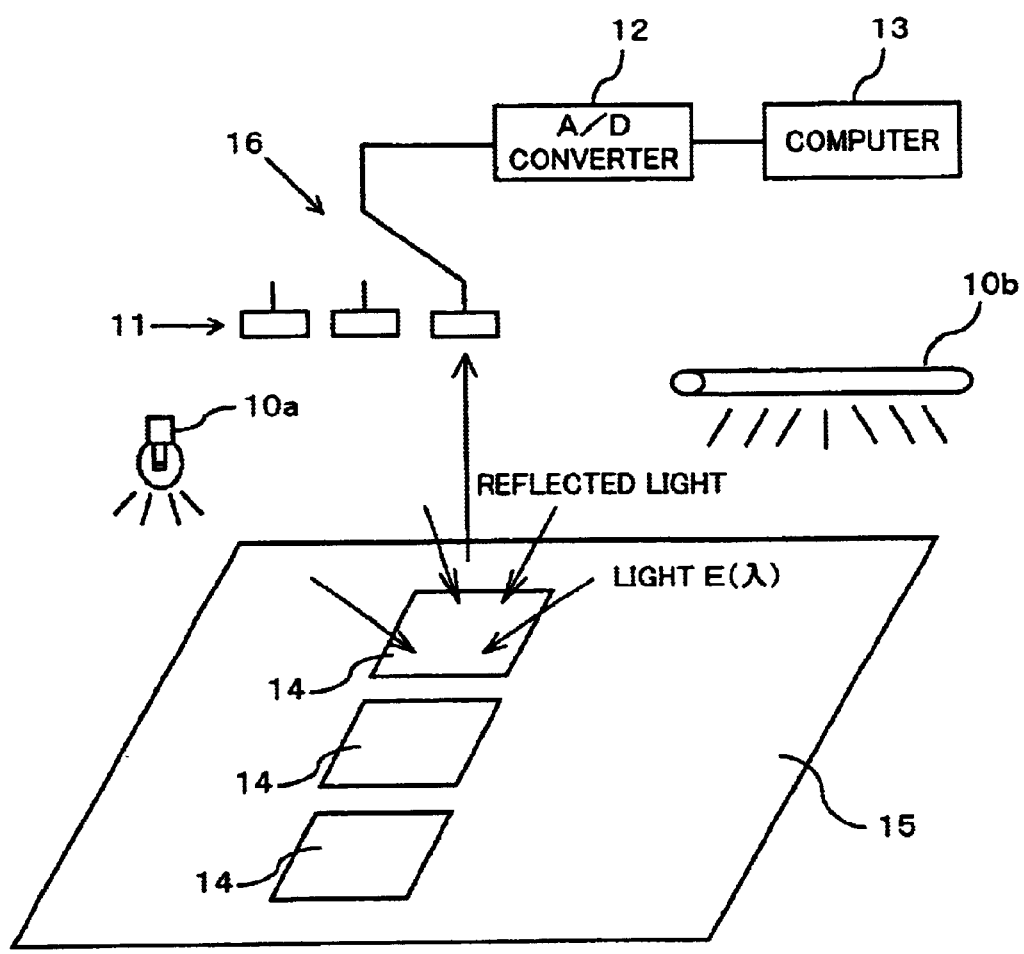
FIG. 1 is a diagram schematically showing an apparatus for measuring a spectral irradiance distribution according to a first embodiment of the present invention.

FIG. 1 is a diagram schematically showing an apparatus for measuring spectral irradiance distribution according to a first embodiment of the present invention. The apparatus of FIG. 1 is used for measuring a spectral irradiance distribution of light irradiating on an object surface 15, and comprises a plurality of optical sensors 11, an A/D converter 12, a computer (calculating section) 13, a plurality of reflectors (light-transit sections) 14, and a change-over switch 16.

n (natural number; n is 3 in FIG. 1) reflectors 14 respectively have n kinds of given reflectances (optical characteristic coefficients) $R(\lambda)$ and are irradiated by light, whose spectral irradiance distribution is to be measured. The reflectors 14 are disposed on the object surface 15.

A particular reflector is designated by $14j$ ($1 \leq j \leq n$, where j is a natural number) and an arbitrary reflector is designated by 14.

s (natural number, e.g. 3 in FIG. 1) optical sensors 11 respectively have s kinds of given sensitivities $S(\lambda)$ and detect individual receiving irradiance of the light received via the reflector 14.

A particular optical sensor is designated by $11i$ ($1 \leq i \leq s$, where i is a natural number), and any arbitrary optical sensor is designated by 11. Preferably all the optical sensors 11 are disposed near to one another.

The A/D converter 12 converts an output signal, such as a current value, from the optical sensor 11 into numerical data, and then inputs the data into the computer 13.

The change-over switch 16 changes over s optical sensors 11 so as to connect these optical sensor 11 successively to the A/D converter 12. With the change-over switch 16, signals from the individual optical sensors 11 are input to the A/D converter 12 in succession.

With one optical sensor 11 connected to the A/D converter 12, receiving irradiances of the light (responses for the light) respectively received via the individual reflectors 14 are detected as the reflectors 14 are changed over one by one. Upon detection of all the receiving irradiances of the light received via the n reflectors 14, the change-over switch 16 selects another optical sensor 11 to repeat the same detection of receiving irradiances of the light received via the n reflector.

The s optical sensors 11 are sequentially selected one at a time by the change-over switch 16 so as to detect receiving irradiances of the light received via the n reflectors 14. As a result, (n×s) kinds of received irradiances of the light are detected.

The computer 13 calculates a spectral irradiance distribution of light. Specifically, the computer 13 calculates m (natural number) spectral irradiances of m kinds of wavelengths as respective spectral irradiance distribution of the light, based on linear formulae established between the reflectances of the reflectors 14, the spectral sensitivities of the optical sensors, (n×s) receiving irradiances obtained by the s optical sensors 11, and the spectral irradiance distributions of the light.

How to calculate spectral irradiance distribution of light by the computer 13 now will be described.

Generally, the spectral irradiance distribution $Hj(\lambda)$ of the light reflected from the reflector $14j$, which enters the optical sensor $11i$, equals to a value that is obtained by dividing the product of a spectral irradiance distribution $E(\lambda)$ of the light irradiating the reflector $14j$ and a spectral reflectivity $Rj(\lambda)$ of the reflector $14j$ by the Ludolph's number ($\pi$). Namely, $Hj(\lambda)$ is expressed by the following formula (1).

$$Hj(\lambda)=1/\pi \cdot E(\lambda) \cdot Rj(\lambda) \tag{1}$$

$o_{ij}$, which is a value of an output signal from the optical sensor $11i$, equals to an integralted of the product of a spectral irradiate distribution $Hj(\lambda)$ of the light entering the optical sensor $11i$ and a spectral sensitivity $Si(\lambda)$ of the optical sensor $11i$ for every wavelength by the range of wavelengths in which the optical sensor 11 has a sensitivity (i.e. the range in which at least one optical sensor 11 has a sensitivity). $o_{ij}$ is expressed by the following formula (2).

$$o_{ij}=1/\pi \int H_j(\lambda) \cdot S_i(\lambda) d\lambda \tag{2}$$

Accordingly, the following formula (3) is established from the formulae (1) and (2). Namely, $o_{ij}$ has linear relationships with $E(\lambda)$, $Si(\lambda)$ and $Rj(\lambda)$.

$$o_{ij}=1/\pi \int S_i(\lambda) \cdot R_j(\lambda) \cdot E(\lambda) d\lambda \tag{3}$$

$E(\lambda)$, $Rj(\lambda)$ and $Si(\lambda)$ are also expressed in the form of discrete values as shown the following formula (4).

$$\left. \begin{array}{l} Si(\lambda) = (s_{i1}, s_{i2}, \cdots, s_{im}) \\ Rj(\lambda) = (r_{j1}, r_{j2}, \cdots, r_{jm}) \\ E(\lambda) = (e_1, e_2, \cdots, e_m) \end{array} \right\} \tag{4}$$

The formula (3) is alternatively expressed by the following formula (5) using the discrete values whose wavelengths has one and the same constant interval $\Delta\lambda$.

$$o_{ij}=1/\pi \cdot (s_{i1} \cdot r_{j1} \cdot e_1 + s_{i2} \cdot r_{j2} \cdot e_2 + \ldots + s_{im} \cdot r_{jm} \cdot e_m) \cdot \Delta\lambda \tag{5}$$

The symbol "m" represents the number of spectral irradiances (kinds of wavelengths) to be calculated. Specifically, m represents the number of bands within the wavelength range to be measured. Assuming that the wavelength range of the optical sensor 11 is from 380 nm to 720 nm and the wavelength interval $\Delta\lambda$ is 5 nm, the number (m) of the band is 69. With such wavelength range and such wavelength interval, $s_{i1}$ indicates the sensitivity of the optical sensor $11i$ at the wavelength of 380 nm, and $S_{i2}$ indicates the sensitivity of the optical sensor $11i$ at the wavelength of 385 nm.

The formula (5) is also alternatively expressed in the form of a matrix as the following formula (6).

$$o_{ij} = 1/\pi \cdot \begin{pmatrix} s_{i1} \cdot r_{ji} \\ s_{i2} \cdot r_{j2} \\ \vdots \\ s_{im} \cdot r_{jm} \end{pmatrix}^T \begin{pmatrix} e_1 \\ e_2 \\ \vdots \\ e_m \end{pmatrix} \cdot \Delta\lambda \tag{6}$$

$$= 1/\pi \cdot R_{ij} \cdot E \cdot \Delta\lambda$$

where, $$Rij = \begin{pmatrix} s_{i1} \cdot r_{j1} \\ s_{i2} \cdot r_{j2} \\ \vdots \\ s_{im} \cdot r_{jm} \end{pmatrix}^T, E = \begin{pmatrix} e_1 \\ e_2 \\ \vdots \\ e_m \end{pmatrix}$$

Further, the formula (6) for every optical sensor $11i$ ($1 \leq i \leq s$) and every reflector $14j$ ($1 \leq j \leq n$) are unitedly expressed as the following formula (7), which refers to all s optical sensors $11i$ and all the n reflectors.

$$\begin{pmatrix} o_{11} \\ o_{12} \\ \vdots \\ o_{1n} \\ o_{21} \\ o_{22} \\ \vdots \\ o_{2n} \\ \vdots \\ o_{s1} \\ o_{s2} \\ \vdots \\ 0_{sn} \end{pmatrix} = 1/\pi \cdot \begin{pmatrix} R_{11} \\ R_{12} \\ \vdots \\ R_{1n} \\ R_{21} \\ R_{22} \\ \vdots \\ R_{2n} \\ \vdots \\ R_{s1} \\ R_{s2} \\ \vdots \\ R_{sn} \end{pmatrix} \cdot E \cdot \Delta\lambda \tag{7}$$

Accordingly, the following formula (8) is obtained from the formula (7).

$$O = 1/\pi \cdot R \cdot E \cdot \Delta\lambda \tag{8}$$

Where, $$O = \begin{pmatrix} o_{11} \\ o_{12} \\ \vdots \\ o_{1n} \\ o_{21} \\ o_{22} \\ \vdots \\ o_{2n} \\ \vdots \\ o_{s1} \\ o_{s2} \\ \vdots \\ 0_{sn} \end{pmatrix}, R = \begin{pmatrix} R_{11} \\ R_{12} \\ \vdots \\ R_{1n} \\ R_{21} \\ R_{22} \\ \vdots \\ R_{2n} \\ \vdots \\ R_{s1} \\ R_{s2} \\ \vdots \\ R_{sn} \end{pmatrix}$$

The value of an output signal from the optical sensor 11 is, as shown in the formula (8), a linear combination of the spectral sensitivity $S(\lambda)$ of the optical sensor 11, the spectral reflectance $R(\lambda)$ of the reflector 14 and the spectral irradiance distribution $E(\lambda)$ of the light irradiates the reflector 14. When the number (m) of bands of the wavelength range to be measured equals to or is smaller than the number (n×s) of receiving irradiates of the light (i.e. m≤n×s), m spectral irradiates, which are spectral irradiance distribution $E(\lambda)$ of the light irradiating the reflector 14, is directly calculated by multiplying O by the generalized reversible matrix of R. Therefore, the apparatus of FIG. 1 measures the spectral irradiance distribution $E(\lambda)$ of the light.

If the number (n) of the reflectors 14 is two or more, the kinds of the spectral sensitivity of the optical sensors 11 (i.e.

the number of the optical sensors 11 respectively having unique and different optical sensitivities) can be set to be small. As a result, the number of the optical sensor does not have to conform to the number (m) of the bands, and the apparatus of FIG. 1 can be manufactured with reduced cost.

Further, since the reflectavance (characteristic coefficients) R(λ) are known, calculating only a spectral irradiance E of the light by the computer 13 suffices, drastically reducing the labor for the calculating.

The reflectors 14 of the illustrated embodiment are preferably lambertian (i.e., having the same spectral reflectance in all directions of incident light) so that the results of measurement are not affected by the position of a light source 10a.

When the number (m) of bands of the wavelength range to be measured is larger than the number of the receiving irradiances of the light (i.e. m>s×n), the linear formula (8) can be solved using later-described constraint. Using the constraints reduces the number (n×s) of the receiving irradiances of the light so that the amount of time needed for the measurement can be decreased, making the apparatus simple in construction resulted from a reduced number of the optical sensor 11.

When the number (m) of bands of the wavelength range to be measured equals to or is less than the number of the receiving irradiances of the received light (i.e. m≦n×s), the constraints can be also applied. As a result, if the result of the measurement is not proper due to an error of the optical sensor 11 or other reason, it is possible to eliminate a possible affection by the error.

The various effective ways to solve the formula (8) will now be described.

①To set a constraint that a spectral irradiance is a positive value:

Since the spectral irradiance is a positive physical value and never takes a negative value, a constraint that the spectral irradiance is positive is effective. The constraint prevents the solution of the formula (8) from being physically improper. It is therefore possible to solve the formula easily and to increase the reliability of the solution of the linear relationship.

Solving the linear formula (8) using the constraint that the spectral irradiance is positive is easily realized by use of a general software package for technical arithmetic operation (e.g., MATLAB of The MathWorks, Inc., Mass., USA).

②To set a constraint that a spectral irradiance distribution of light is expressed by the linear combination of linear formulae of the predetermined spectral irradiance distribution:

If spectral irradiance distributions of various light sources are analogous to one other, they are generally expressed by a linear combination of several components. For example, the spectral irradiance distribution of varying natural daylight, such as morning light, midday light, shine-day light or cloudy-day light, is expressed by linear combination of three components (Günter Wyszecki and W. S. Stiles, "Color Science: Concepts and Methods, Quantitative Data and Formulae Second Edition, 3.3.4 CIE Standard Illuminants", John Wiley & Sons, Inc. (1982)).

Since E is expressed by a linear combination of several components P1 through Pk (k is a natural number representing the number of components of the spectral irradiance distribution) as shown in the following formula (9), the formula (8) is solved using the formula (9).

$$E = P \cdot C \qquad (9)$$

where, $$P = [P_1 \quad P_2 \quad \cdots \quad P_k] = \begin{pmatrix} P_{11} & P_{21} & \cdots & P_{k1} \\ P_{12} & P_{22} & \cdots & P_{k2} \\ \vdots & \vdots & \cdots & \vdots \\ P_{1m} & P_{2m} & \cdots & P_{km} \end{pmatrix}, C = \begin{pmatrix} C_1 \\ C_2 \\ \vdots \\ C_k \end{pmatrix}$$

Specifically, the formula (9) is assigned into the formula (8) to yield the following formula (10), and then the formula (10) is solved for C. Subsequently, C is assigned to the formula (9) to obtain the spectral irradiance E.

$$O = 1/\pi \cdot R \cdot P \cdot C \cdot \Delta\lambda \qquad (10)$$

When the number (k) of the components of the spectral irradiance distribution equals to or is larger than the number of the receiving irradiances of the light (i.e., n×S≦k), it is possible to solve the formula (8) using a generalized reversible matrix according to (R·P). The number (m) of bands tends to be relatively large, e.g., 69 as described above. On the contrary, the number (k) can be a smaller number than m. For example, the number (k) of natural daylight is three (k=3). Accordingly, the constraint that a spectral irradiance distribution of light is expressed by the linear combination of the linear formulae of the predetermined spectral irradiance distribution (k components) reduces the number (n×s) of receiving irradiances of the light to be measured. Therefore the linear formula can be easily solved and, as a result, a spectral irradiance distribution of light can be easily calculated, increasing the reliability of the solution of the linear relation and, also making the apparatus simple in construction.

When solving the formula (10), another constraint that the spectral irradiance is positive value (①) maybe also set. Namely, since the spectral irradiance is a positive value, using this constraint can prevent the spectral irradiance distributions from being a physically improper value, improving the reliability of the answer of the linear relationship.

③To use various principal components of spectral irradiance distributions of real light sources as P:

A report discloses that the spectral irradiance distribution of the fluorescent light can be paralleled with linear combination of four principal components (Yoshinobu Nayatani, Yutaka Kurioka and Hiroaki Sobagaki, "Color-Matching Properties of Fluorescent Lamps with Different Values of the General Color-Rendering Index," Bul. Electrotech. Lab. (Japan), Vol. 35 No. 12 (1971)). Accordingly, when the measurement is performed on the object surface illuminated by the fluorescent light, the four principal components can be used, improving the reliability of the answer of the linear relationship.

Generally, partly since the values of the components except for the first principal component are negative, and partly since the results of the linear combination of the four principal components possibly include a negative value, a constraint that the spectral irradiance is a positive value (the constraint ①) may be set in addition to the constraint ③.

④To use only components having positive values as P, and to set a constraint that every C is not negative:

Only components having positive values may be used as P, and a constraint that every C is not negative may be set. As a result, since products of a positive value and a non-negative value ensured to be positive, it is possible to improve the reliability of the solution to the formula (8).

Components P having positive values are obtained as a linear combination of the principal components by a calculating way described in "Estimating Absorption Bands of Component Dyes by Means of Principal Component Analysis," (Noboru Ohta, Analytical Chemistry, Vol.45, 553–557 (March 1973); hereinafter called reference #1). Although, in reference #1, an object to be processed is spectral data of color materials in a photograph, the same way can be applied to calculation of the spectral irradiance distribution of the light source in the illustrated embodiment.

Further, only processing three components is disclosed in reference #1. Namely, the processing of reference #1 produces only three components as the result, and can be also applied to the cases obtaining two components or more than two components. The detailed procedure to process various numbers of components is disclosed in "Estimation of Number and Spectral Characteristics of Component Dyes by Principal Component Analysis (1) Two-component System" (Noboru Ohta, Kohji Takahashi, Journal of Photographic Science and Technology Society of Japan, Vol. 36, No. 5 (1973)" and "Estimation of Number and Spectral Characteristics of Component Dyes by Principal Component Analysis (III) Multiple-component System" (Kohji Takahashi, Noboru Ohta, Journal of Photographic Science and Technology Society of Japan, Vol. 38, No. 6 (1975)).

⑤ To use a spectral irradiance distribution of a real typical light source as P:

A spectral irradiance distribution of a real light source is composed of positive values. For example, all possible spectral irradiance distributions under an assumed irradiating environment can be designated by P.

Two or more components, such as P1, P2, etc., having different spectral irradiance are prepared in advance as P. And the spectral irradiance distribution of light (calculating result E1, E2, etc.) is calculated based on each component by one of the above-mentioned two methods. One result, which makes the error of the linear relation (5) minimal, can be selected among plural results of computing as the final answer. Therefore, when plural different components are assumed as P, the most accurate result of calculating can be selected, also improving the reliability of the solution to the linear relationship.

In the above-mentioned description, (n×s) receiving irradiances of the light on the n reflectors 14 are detected as the reflectors 14 are sequentially changed over by the change-over switch 16. The present invention should by no means limited to the illustrated embodiment, and alternatively, the reflected light from each of the reflector 14 may be input to an increased number of the optical sensors 11 at one time. As one specified example, the plural reflectors 14 may be photographed by a digital still camera.

(B) First Embodiment

Figure 2:
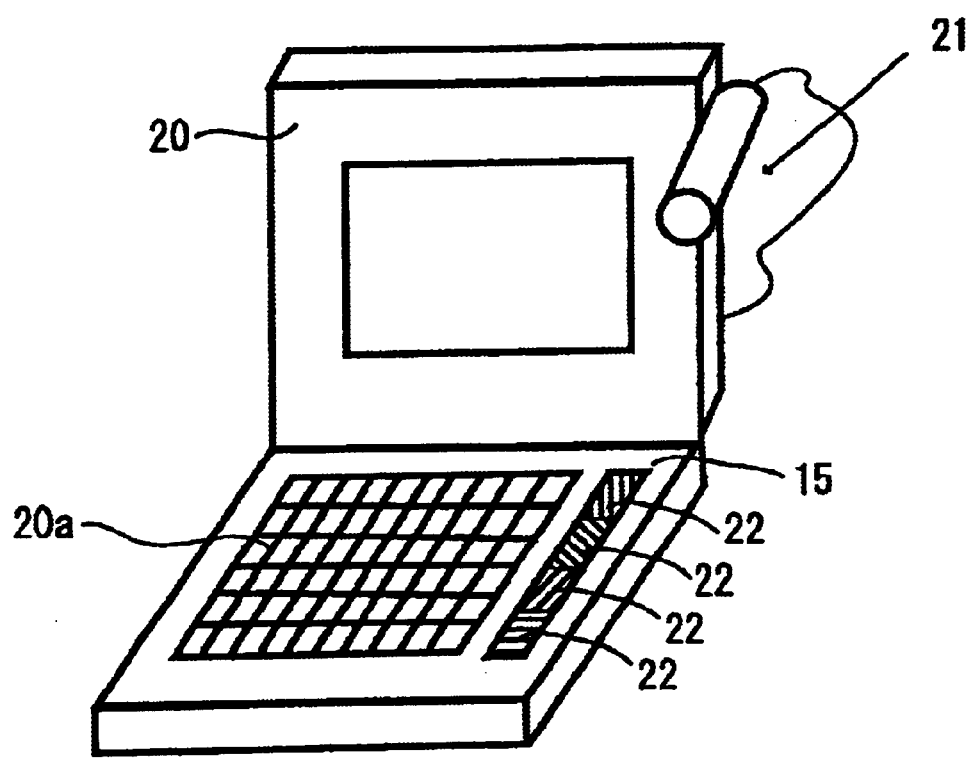
FIG. 2 is a diagram schematically showing one example to which the apparatus of the first embodiment is applied.
Figure 3:
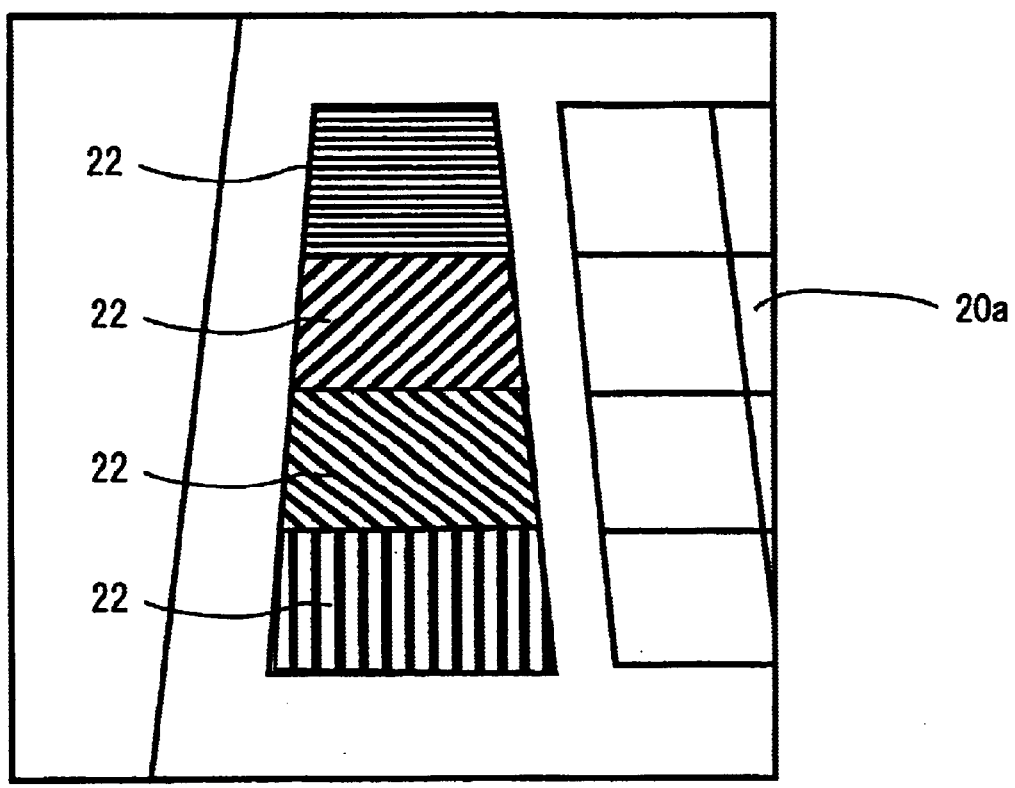
FIG. 3 is a diagram schematically showing an image photographed by a digital camera.

FIG. 2 is a diagram schematically showing a first embodiment to which the spectral irradiance distribution measuring apparatus is applied, and FIG. 3 is a diagram schematically showing an image photographed by a digital camera. The apparatus of FIG. 2 uses a notebook type computer and a digital camera in combination. Namely, the apparatus is equipped with a notebook type computer 20, a digital camera (optical sensor) 21, and four color chips (light-transit sections) 22, which respectively correspond to the reflectors 14.

The plural (four in FIG. 2) color chips 22, which correspond to the reflectors 14, are disposed side by side on an object surface 15 where a keyboard 20a of the notebook type computer 20 is installed. The four color chips 22 respectively have different reflectances (optical characteristic coefficients), which are given beforehand. The reflectavances of the individual color chips 22 are preferred to be largely different from one other, and the hue of the individual color chips 22 is also preferred to be bright and to be largely different form one other.

A particular color chip is designated by 221 through 224, and any one or more arbitrary color chips are designated by 22.

The digital camera 21 has a given spectral sensitivity and a given gradation characteristic, and obtains RGB values from photographed images. The gradation characteristic of the digital camera 21 represents a gradation characteristic of each output signal of R (Red), G (Green), B (Blue). The gradation characteristic of the digital camera 21 is detected in terms of the change of each component of RGB values while the amount of light enters the digital camera 21 is gradually increased. Generally, the gradation characteristic is expressed by an exponential ($\gamma$ character).

R, G, Bare signal values output from the digital camera 21, and each takes a value between 0 and 255.

The digital camera 21 is mounted on the notebook type computer 20 so as to photograph the color chips 22. The position between each color chip 22 and the digital camera 21 is determined in advance so that the positions of the individual color chips 22 always substantially conform to the photographs taken by the digital camera 21.

The notebook type computer 20 calculates a spectral irradiance distribution $E(\lambda)$ of the light irradiating the color chip 22 based on the image (i.e., RGB values) photographed by the digital camera 21.

In the illustrated embodiment, the number (n) of the reflectors 14 as mentioned above in (A) "Principle of the Invention" is four, and the number (s) of the optical sensors 11 is three.

Since the spectral irradiance distribution is calculated on the basis of processing of linear combination in the illustrated embodiment, signals to be processed for the respective amounts of entering light have to be linear. The signals to be processed are corrected based on the gradation characteristic of the digital camera 21. For example, when the $\gamma$ value, which represents the gradation characteristic of the digital camera 21, is 2.2, RGB values output from the digital camera 21 are converted into values of (r, g, b), which respectively have linear formulae between the amount of the light in accordance with the manner described below. The values of r, g, b are obtained by lineary correcting RGB values as expressed by the following formula (11), and each takes a value between 0 and 1.

$$\left.\begin{array}{l} r = (R/255)^{(1/r)} \\ g = (G/255)^{(1/r)} \\ b = (B/255)^{(1/r)} \end{array}\right\} \quad (11)$$

The optical sensitive characteristic of the digital camera 21 is assumed to be given values in the illustrated embodiment. Otherwise if the optical sensitive characteristic of the digital camera 21 is an unknown value, the optical sensitive can be calculated by a method disclosed in "Multichannel Vision System for Estimating Surface and Illumination Function" (Shoji Tominaga, J. Opt. Soc. Am. A, Vol. 13, No. 11, 2163–2173 (Nov. 1996)) in advance.

In this embodiment, the spectral irradiance distributions are measured in the range between 380 nm and 720 nm with intervals of a wavelength ($\Delta\lambda$) of 5 nm. As a result, the number (m) of bands is 69, which is larger than 9, i.e., the number (n×s) of received light.

First of all, the formula (10) is solved for C and then $E(\lambda)$ is obtained by assigning the obtained C into the formula (9).

For obtaining the spectral irradiance distribution E(λ), spectral irradiance distributions of several light sources are used without being processed. In the illustrated example, two sets of spectral irradiances P1 and P2 is used as light sources as shown in the following formula (12). P1 designates fluorescent light, and P2 designates natural daylight. Further the environment where measuring takes place is a room irradiated by fluorescent light, the room having at least one window.

$$P1 = [D_{5000} D_{7000} F_1 F_4 F_7 F_9 F_{10} F_{12}]$$
$$P2 = [D_{7000} D_{10000} F_1 F_4 F_7 F_9 F_{10} F_{12}]$$
(12)

P1 and P2 represent data of spectral irradiance of every 5 nm wavelengths between 380 nm and 720 nm. $D_{5000}$, $D_{7000}$ and $D_{10000}$ are spectral irradiance distributions of standard natural daylight established by CIE (Commission Internationale de l'Eclairage), and assume light (daylight) entering via a window.

The color temperatures $D_{5000}$, $D_{7000}$ and D10000 are 5000K, 7000K and 10000K, respectively, (Günter Wyszecki and W. S. Stiles, "Color Science: Concepts and Methods, Quantitative Data and Formulae Second Edition, 3.3.4 CIE Standard Illuminants", John Wiley & Sons, Inc. (1982)).

The color temperatures of natural daylight is sorted because natural daylight having different color temperatures usually do not have to be considered as concurrently occurring. With daylight sorted by color temperature into light of low color temperatures (5000K through 7000K) and that of high color temperatures (7000K through 10000K), light of an intermediate color temperature, such as 6000K or 8000K, can be respectively expressed as a linear combination of $D_{5000}$ and $D_{7000}$, or $D_{7000}$ and $D_{10000}$. Coefficients of each multiplication are positive values.

The spectral irradiance distributions E(λ) of light are calculated using P1 and P2, whose color temperatures assumed to be respectively low and high, as shown in the formula (12). Then either one spectral irradiance distribution E(λ) which makes the error square of the formula (8) minimal is selected as a spectral irradiance distribution of the light (the final solution).

For calculating a spectral irradiance distribution E(λ) of light which does not have to be assumed natural daylight whose color temperature is low (e.g., daylight around noon which is not reddish like daylight at sunrise and sunset), only a natural daylight component P2, whose color temperature is assumed to be high, may be used.

F1, F4, F7, F9, F10 and F12 are spectral irradiance distributions of typical fluorescent light as standerized by the CIE (R. W. G. Hunt, "Measuring Color Third Edition", "A5.3 Representative Fluorescent lamps", FOUNTAIN PRESS (1998)).

Specifically, F4 is a spectral irradiance distribution of reddish light of the standard fluorescent light, and F1 is a spectral irradiance distribution of bluish light of the standard fluorescent light. F9 is a spectral irradiance distribution of reddish light of a high color rendering fluorescent light, and F7 is a spectral irradiance distribution of bluish light of the high color rendering fluorescent light. F12 is a spectral irradiance distribution of reddish light of a three-band fluorescent light, and F10 is a spectral irradiance distribution of bluish light of the three-band fluorescent light.

A spectral irradiance distribution of other typical fluorescent light can be approximately calculated as a linear combination of F1, F4, F7, F9, F10 and F12. Coefficients of each multiplication are always positive values.

Figure 4:
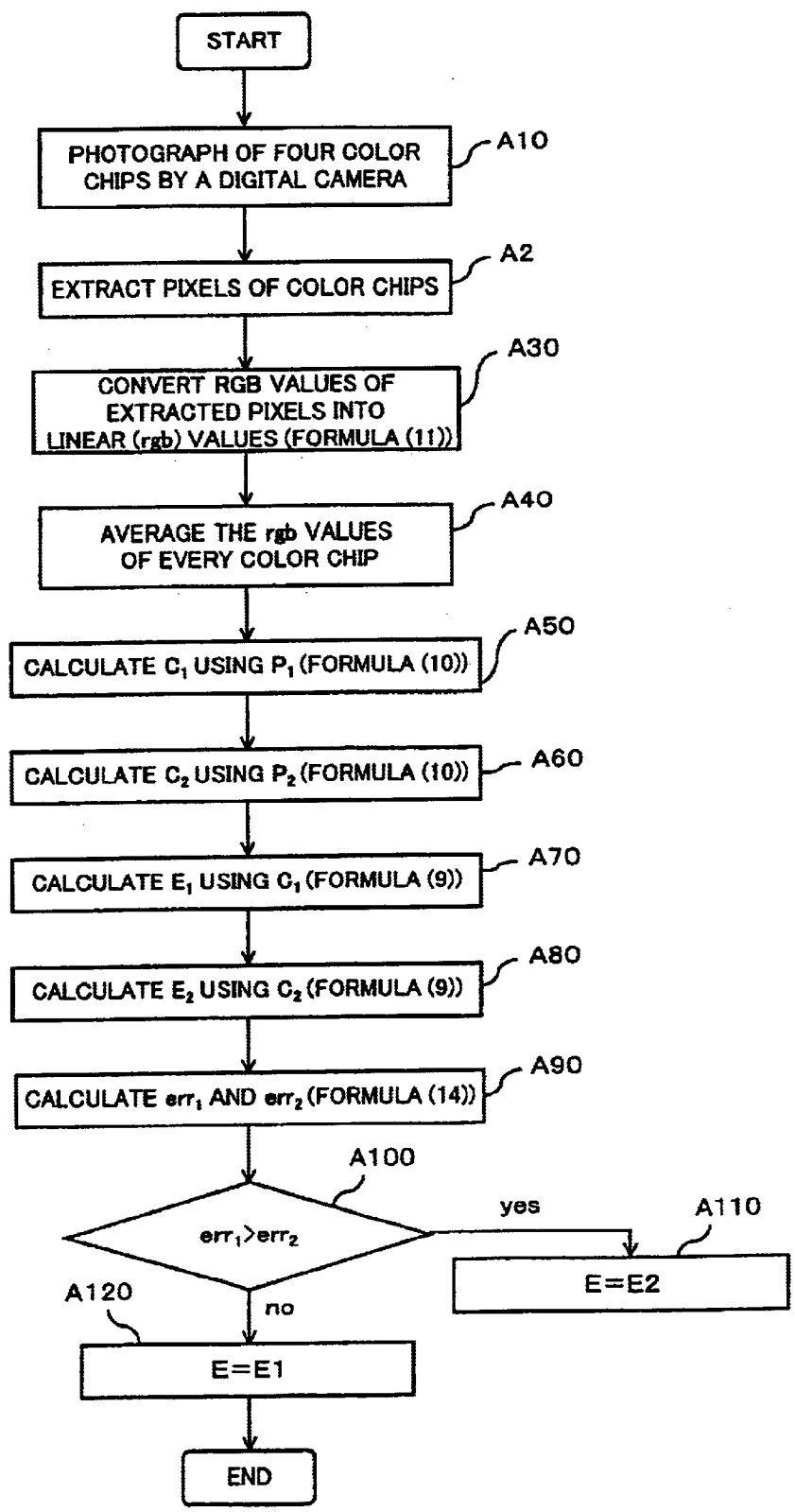
FIG. 4 is a flowchart illustrating the procedure in which a spectral irradiance distribution of light irradiating color chips is measured on the apparatus of the first embodiment.

The procedure in which a spectral irradiance of light irradiating the color chip 22 is measured will now be described with reference to a flowchart (Steps A10 through A120) of FIG. 4.

The digital camera 21 photographs n (n is four in the illustrated embodiment) color chips (reflectors) 22 and then captures the image (Step A10)

A predetermined number of pixels of each color chip 22 (e.g., 20 pixels in every color chip 22) are extracted from the image photographed by the digital camera 21 based on a known position of each color chip 22 (Step A20).

The RGB values of extracted pixels are converted into linear values of the rgb values using the formula (11) (Step A30), and the rgb values of each color chip 22 are averaged so as to calculate an rgb value for every color chip 22 (Step A40), which is the above-mentioned output value O of the optical sensor 11.

If the rgb values of the four color chips 221, 222, 223 and 224 are respectively expressed by (r1, g1, b1), (r2, g2, b2) (r3, g3, b3) and (r4, g4, b4) an output o of the digital camera 21 is the following formula (13).

$$O = \begin{pmatrix} o_{11} \\ o_{12} \\ o_{13} \\ o_{21} \\ o_{22} \\ o_{23} \\ \vdots \\ o_{41} \\ o_{42} \\ o_{43} \end{pmatrix} = \begin{pmatrix} r_1 \\ g_1 \\ b_1 \\ r_2 \\ g_2 \\ b_2 \\ \vdots \\ r_4 \\ g_4 \\ b_4 \end{pmatrix}$$
(13)

Cs (C1, C2) of spectral irradiances P1, P2 are calculated using the formulae (10) and (13) (Step A50, A60). At that time, a constraint that C is a positive value is set for calculation.

Subsequently, C1 and C2 are separately assigned into the formula (9) to obtain the spectral irradiance distributions E1 and E2. Then, E1 and E2 are separately assigned into the formula (8) to calculate the square errors err1, err2 of equations as shown in the formula (14) (Step A90).

$$err_1 = (O - 1/\pi \cdot R \cdot E_1 \cdot \Delta\lambda) T \cdot (O - 1/\pi \cdot R \cdot E_1 \cdot \Delta\lambda)$$
$$err_2 = (O - 1/\pi \cdot R \cdot E_2 \cdot \Delta\lambda) T \cdot (O - 1/\pi \cdot R \cdot E_2 \cdot \Delta\lambda)$$
(14)

Further, err1 is compared with err2 (Step A100) and the spectral irradiance distribution having the smaller square error is selected from the calculated spectral irradiance distributions E1 and E2 as a final solution of the measurement. Namely, the spectral irradiance distribution E(λ) of the light irradiating the color chip 22 can be measured (Steps A110, A120).

With the apparatus of the illustrated embodiment, receiving irradiances are calculated based on the n (four in the illustrated example) reflectors 14 respectively having n kinds of given reflectances and the s (three in the illustrated example) optical sensors 11 respectively given s optical sensitivities. Then the notebook type computer 20 calculates m spectral irradiances for m kinds of wavelengths as a spectral irradiance distribution of the light based on the linear formula established between the reflectances, the spectral sensitivities, (n×s) (twelve in the illustrated example) receiving irradiances, and the spectral irradiance distribution of the light. As a result, the number of the optical sensor 11 can be reduced, and the spectral irradiance distribution of the light can be calculated with ease. Further, it is possible to make the apparatus simple in construction.

The apparatus is equipped with the n reflectors 14 and the s optical sensors 11 so that the number (n×s) of the receiving irradiances of the light detected by the optical sensors 11 is equal to or more than the number (m) of the spectral irradiances to be calculated based on the linear formulae. Therefore, directly solving the linear formula calculates the m kinds of spectral irradiances and unnecessitates a complicated constraint, making the apparatus simple in construction.

Partly since the apparatus is equipped with the n reflectors 14 and the s optical sensors 11 so that the number (n×s) of the receiving irradiances of the light detected by the optical sensors 11 is smaller than the number (m) of the spectral irradiances to be calculated based on the linear formulae, and partly since the linear formula is solved under a predetermined constraint, it is possible to decrease the number of the optical sensors 11, making the apparatus simple in construction and surely solving the linear formula. Further, it is also possible to improve the reliability of the apparatus.

It is possible to solve the complicated linear formula with ease by setting a predetermined constraint, such that a spectral irradiance distribution of the light is a positive value, or a spectral irradiance distribution of light is a linear combination of predetermined spectral irradiance distributions of light. As the result, it is possible to improve the reliability of the solution of the linear formula.

At that time, it is possible to solve the linear formula with ease and increase the reliability of the solution of the linear formula by adding another constraint that the predetermined spectral irradiance distribution of the light is a positive value and the predetermined spectral irradiance distribution is expressed in the form of a linear combination based on a non-negative coefficient.

The predetermined spectral irradiance distributions may be the principal components of the spectral distributions of light sources which are assumed beforehand, or a linear combination of the principal components of the spectral irradiance distributions of the assumed light sources, or spectral irradiance of the assumed light source. Such predetermined spectral irradiance distribution increases there liability of the solution of the linear formula.

It is possible to improve the reliability of the calculated spectral irradiance distribution, partly since plural sets of predetermined spectral irradiance distribution are prepared for calculation the spectral irradiance distribution of the light for each set, and partly since a spectral irradiance distribution having the minimum error of the linear formula is selected from the spectral irradiance distributions of the plural sets as the spectral irradiance distribution of the light. Therefore is increased.

In the illustrated embodiment, the spectral irradiance distribution of the light irradiates the color chip 22 (the reflector 14) is calculated using the spectral irradiance distributions of the real typical light source (fluorescent light and natural daylight) as P likewise the constraint ⑤ and a constraint that C is a non-negative value. The present invention should by no means be limited to the illustrated embodiment, and various other changes or modifications may be suggested without departing from the gist of the invention.

For example, in an alternative, principal components of plural light sources may be extracted to calculate the spectral irradiance distribution of the light (the constraint ③). In this case, if another constraint is added, it is preferable to set a constraint that the spectral irradiance E is a positive value, instead of a constraint that C is a positive value, since a linear combination of the principal components is not always a positive value.

For example, the principal components may be calculated using any combination of the following light sources.
(i) Daylight: calculate three principal components of every 1000Ks between 4000K CIE daylight through 15000K CIE daylight.
(ii) Fluorescent light: calculate four principal components for F1 through F12 (twelve light sources).
(iii) Light bulb: calculate two principal components of every 100Ks of black radiation between 2000K and 3500K.

In another alternative, a positive linear combination of the principal components may be used as P (the constraint ②). In this case, if another constraint is added, it is preferable to set the constraint that C is a positive value like the illustrated embodiment.

First of all, two principal components are extracted from each of groups (i) through (v) described below, and then distributions of positive values are calculated using the method disclosed in "Estimating Absorption Bands of Component Dyes by Means of Principal Component Analysis" (Noboru Ohta, Analytical Chemistry, Vol. 45, 553–557 (March, 1973)).
(i) daylight having a low color temperature: components of every 500Ks between 4000K CIE daylight through 7000K CIE daylight.
(ii) daylight having a high color temperature: components of every 1000Ks between 7000K CIE daylight through 15000K CIE daylight.
(iii) standard fluorescent light: F1 through F6.
(iv) high color rendering fluorescent light: F7 through F9.
(v) three-band fluorescent light: F10 through F12.

Figure 5:
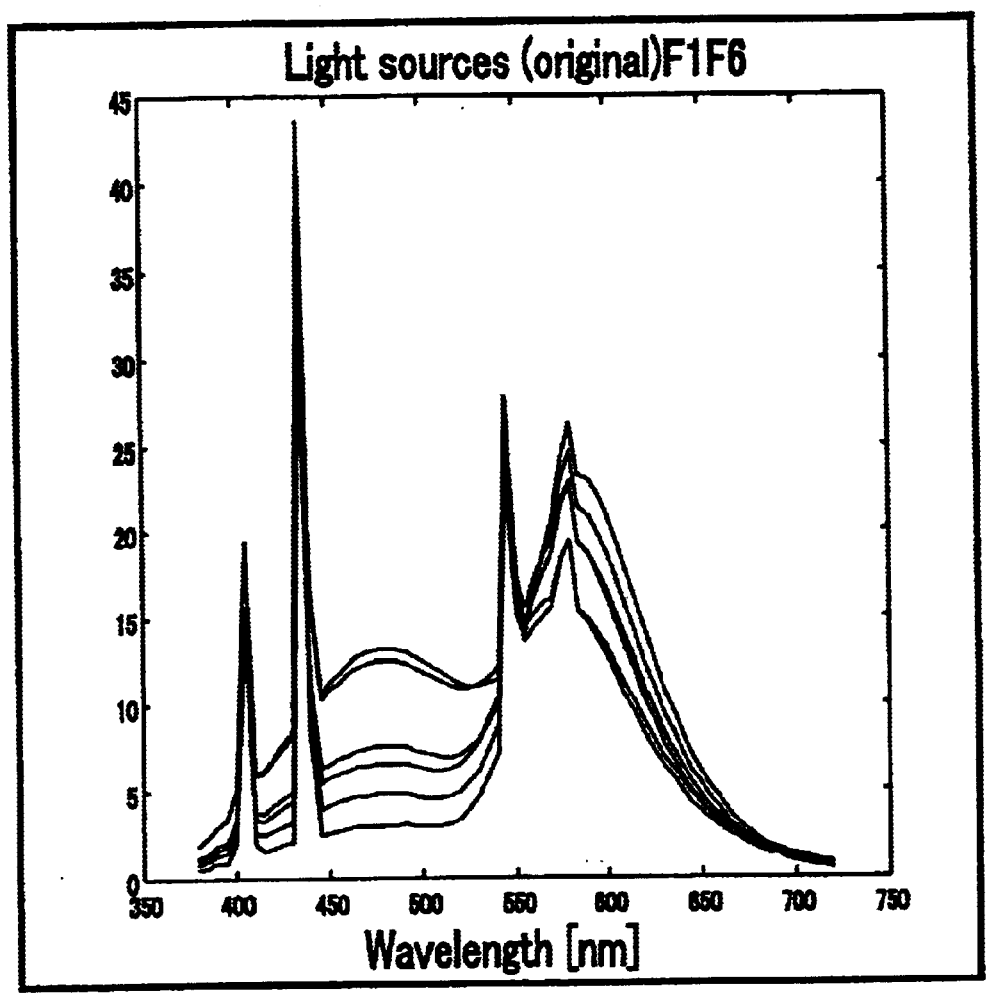
FIG. 5 is a graph showing spectral irradiate distributions of six light components of standard fluorescent light.
Figure 6:
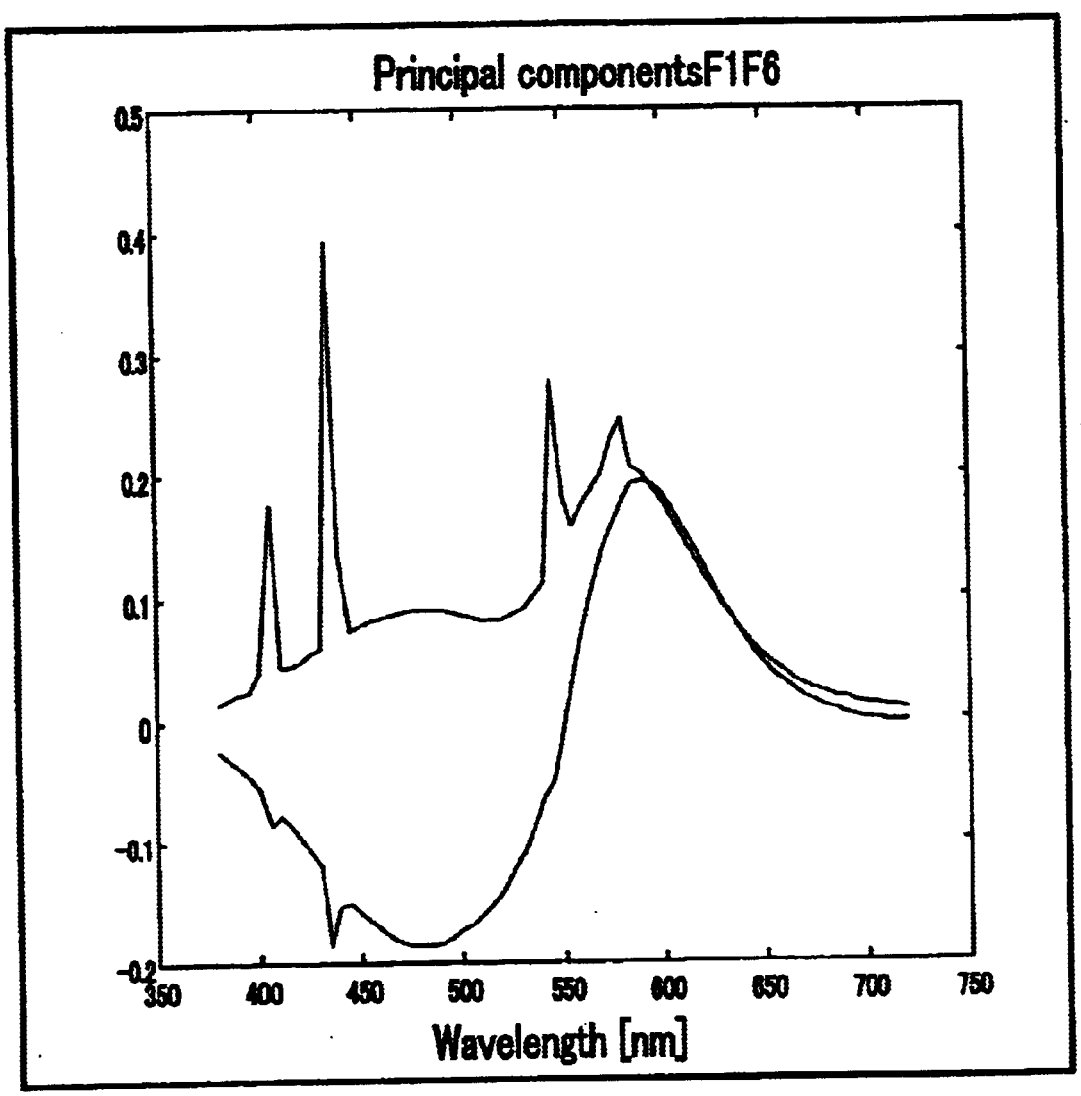
FIG. 6 is a graph showing two principal components calculated from the spectral distributions of the six light components of the standard fluorescent light.
Figure 7:
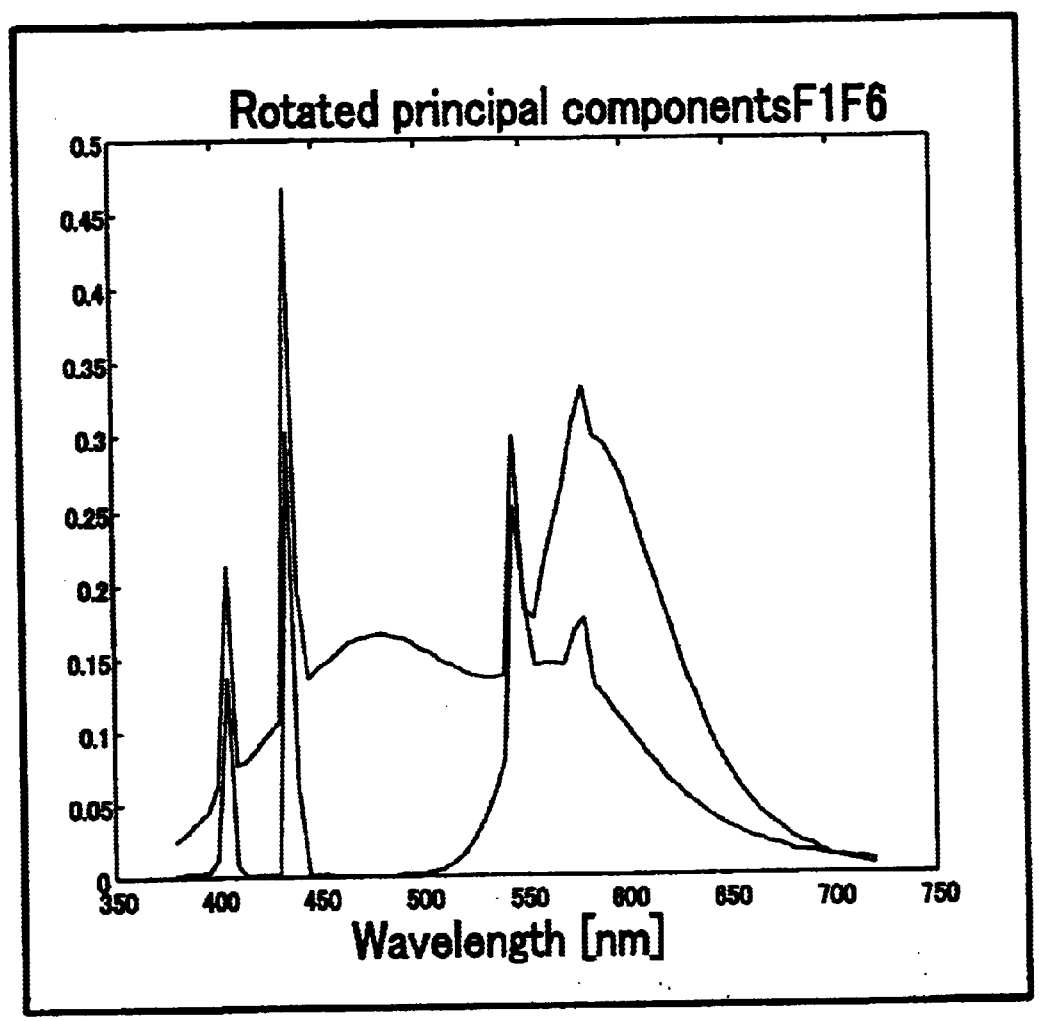
FIG. 7 is a graph showing distributions of positive values of the two principal components of FIG. 6.

The spectral irradiance distributions of six components (F1 through F6) of the standard fluorescent light (iii) are shown in FIG. 5; spectral irradiance distributions of the two principal components calculated from the six components, in FIG. 6; and distributions of the positive values calculated from the two principal components of FIG. 6, in FIG. 7.

In the illustrated embodiment, the light-transit sections, which transmit the light, are in the form of the reflectors 14. But, the present invention should by no means be limited to the illustrated embodiment.

(C) Second Embodiment

Figure 8:
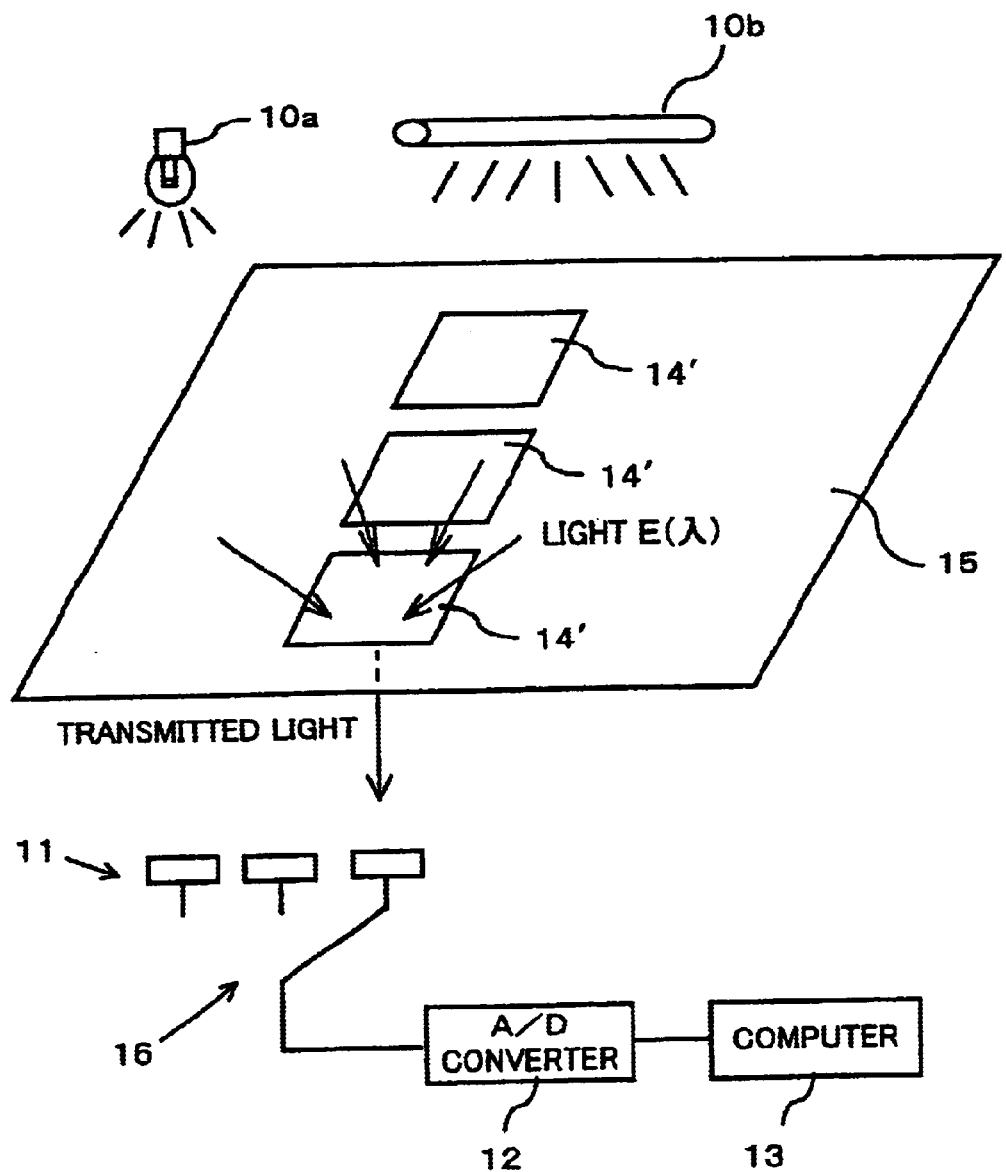
FIG. 8 is a diagram schematically showing another apparatus for measuring a spectral irradiance distribution according to a second embodiment of the present invention.
Figure 9:
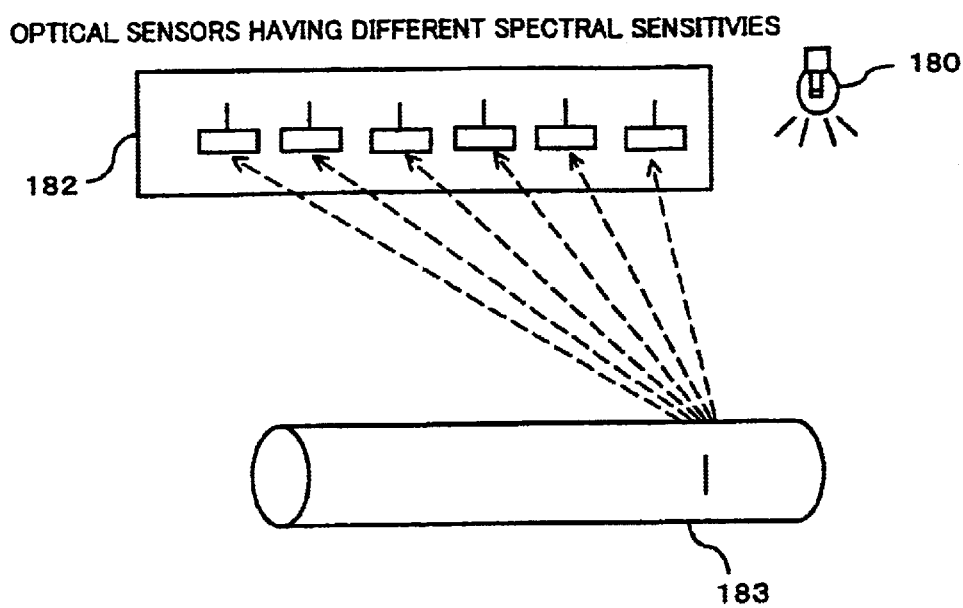
FIGS. 9 and 10 are diagrams respectively showing conventional spectral irradiance distribution measuring methods.
Figure 10:
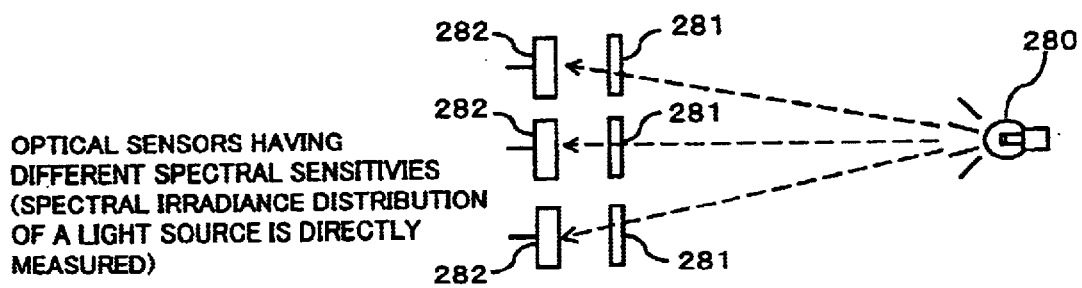

FIG. 8 is a diagram schematically showing an apparatus for measuring a spectral irradiance distribution according to a second embodiment of the present invention. The apparatus of FIG. 8 includes scattering filters 14' as substitutions for the reflectors 14 of FIG. 1. Like reference numbers designate similar parts or elements throughout FIG. 1 and FIG. 8, so any repetitious explanation is omitted here.

The n (n is a natural number, e.g., 3 in FIG. 8) scattering filters 14', which respectively have n kinds of given transmittances $T(\lambda)$ (optical characteristic coefficients), are illuminated by the light to be measured. The n scattering filters 14' is disposed on the object surface 15.

The s (s is a natural number, e.g., 3 in FIG. 8) optical sensors 11, which respectively have s kinds of given spectral sensitivities $S(\lambda)$ (optical characteristic coefficients), detect individual receiving irradiances of the light received via the n scattering filters 14'. The s optical sensors 11 are disposed such a posture that the optical sensors face light sources 10a, 10b with then scattering filter 14' interposed.

The spectral transmittances $Tj(\lambda)$ of the individual scattering filter 14', which are substitutions for the spectral reflectavances $Rj(\lambda)$ of the individual reflector 14, are used as the optical characteristic coefficients of the light-transit section so that receiving irradiances of the light transmitted through the scattering filter 14' are detected by the optical sensor 11. It is particularly preferable that the optical sensors 11 face the light sources 10a, 10b with the object surface 15 interposed.

The scattering filters 14' are preferably lambertian (i.e., having the same spectral reflectance in all directions of incident light).

The scattering filters 14' having different spectral transmittances may be any combination of plural scattering filters 14' having an identical spectral transmittance and non-scattering transmitting filters having different optical characteristics.

Further, the present invention should by no means be limited to these foregoing embodiments, and various changes or modifications may be suggested without departing from the gist of the invention.

What is claimed is:

1. A method of measuring a spectral irradiance distribution of light, comprising the steps of:
   (a) receiving the light on each of a natural number s of optical sensors, each of which has a different given spectral sensitivity, via a natural number n of light-transit sections, each of which has a different given optical characteristic coefficient;
   (b) detecting individual responses for the light, which is received via said n light-transit sections, by each and every one of said s optical sensors, and obtaining a natural number n×s of total responses for the received light; and
   (c) calculating a natural number m of spectral irradiances for m kinds of wavelengths as a spectral irradiance distribution of the light, based on one or more linear formulae established between said optical characteristic coefficients, said spectral sensitivities, said n×s responses for the light, and said spectral irradiance distribution of the light.

2. A method of measuring a spectral irradiance distribution of light according to claim 1, wherein:
   said optical sensors and said light-transit sections are arranged in such a manner that the number n×s of said responses for the light detected by said optical sensors is equal to or larger than the number m of said spectral irradiances to be calculated based on said linear formulae; and
   said m spectral irradiances are calculated by directly solving said linear formulae.

3. A method of measuring a spectral irradiance distribution of light according to claim 1, wherein:
   said optical sensors and said light-transit sections are arranged in such a manner that the number n×s of said responses for the light detected by said optical sensors is smaller than the number m of said spectral irradiances to be calculated based on said linear formulae; and
   said m spectral irradiances are calculated by solving said linear formulae under a predetermined constraint.

4. A method of measuring a spectral irradiance distribution according to claim 3, wherein said predetermined constraint is such that said spectral irradiance distribution of the light is a positive value.

5. A method of measuring a spectral irradiance distribution according to claim 3, wherein said predetermined constraint is such that said spectral irradiance distribution of the light is expressed by a linear combination of predetermined spectral irradiance distributions.

6. A method of measuring a spectral irradiance distribution according to claim 4, wherein said predetermined constraint is such that said spectral irradiance distribution of the light is expressed by a linear combination of predetermined spectral irradiance distributions.

7. A method of measuring a spectral irradiance distribution according to claim 5, wherein another constraint is added to said predetermined constraint, said another constraint being such that:
   said spectral irradiance distribution of the light is a positive value; and
   said spectral irradiance distribution of the light is expressed by linearly combining said predetermined spectral irradiance distribution with a non-negative coefficient.

8. A method of measuring a spectral irradiance distribution according to claim 6, wherein another constraint is added to said predetermined constraint, said another constraint being such that:
   said spectral irradiance distribution of the light is a positive value; and
   said spectral irradiance distribution of the light is expressed by linearly combining said predetermined spectral irradiance distribution with a non-negative coefficient.

9. A method of measuring a spectral irradiance distribution according to claim 5, wherein said predetermined spectral irradiance distribution is a principal component of estimated spectral irradiance distributions of one or more light sources.

10. A method of measuring a spectral irradiance distribution according to claim 6, wherein said predetermined spectral irradiance distribution is a principal component of estimated spectral irradiance distributions of one or more light sources.

11. A method of measuring a spectral irradiance distribution according to claim 7, wherein said predetermined spectral irradiance distribution is a principal component of estimated spectral irradiance distributions of one or more light sources.

12. A method of measuring a spectral irradiance distribution according to claim 8, wherein said predetermined spectral irradiance distribution is a principal component of estimated spectral irradiance distributions of one or more light sources.

13. A method of measuring a spectral irradiance distribution according to claim 5, wherein said predetermined spectral irradiance distribution is a linear combination with principal components of estimated spectral irradiance distributions of one or more light sources.

14. A method of measuring a spectral irradiance distribution according to claim 6, wherein said predetermined spectral irradiance distribution is a linear combination with principal components of estimated spectral irradiance distributions of one or more light sources.

15. A method of measuring a spectral irradiance distribution according to claim 7, wherein said predetermined spectral irradiance distribution is a linear combination with principal components of estimated spectral irradiance distributions of one or more light sources.

16. A method of measuring a spectral irradiance distribution according to claim 8, wherein said predetermined spectral irradiance distribution is a linear combination with principal components of estimated spectral irradiance distributions of one or more light sources.

17. A method of measuring a spectral irradiance distribution according to claim 5, wherein said predetermined spectral irradiance distribution an estimated spectral irradiance of a light source.

18. A method of measuring a spectral irradiance distribution according to claim 6, wherein said predetermined spectral irradiance distribution is an estimated spectral irradiance of a light source.

19. A method of measuring a spectral irradiance distribution according to claim 7, wherein said predetermined spectral irradiance distribution is an estimated spectral irradiance of a light source.

20. A method of measuring a spectral irradiance distribution according to claim 8, wherein said predetermined spectral irradiance distribution is an estimated spectral irradiance of a light source.

21. A method of measuring a spectral irradiance distribution according to claim 5, further comprising:

preparing a plurality of sets of said predetermined spectral irradiance distributions;

calculating said spectral irradiance distributions of the light respectively using the prepared plural sets of spectral irradiance distributions; and selecting, among a plurality of the calculated spectral irradiance distributions of light, one spectral irradiance distribution whose error in said linear formulae is minimal.

22. A method of measuring a spectral irradiance distribution according to claim 6, further comprising:

preparing a plurality of sets of said predetermined spectral irradiance distributions;

calculating said spectral irradiance distributions of the light respectively using the prepared plural sets of spectral irradiance distributions; and selecting, among a plurality of the calculated spectral irradiance distributions of light, one spectral irradiance distribution whose error in said linear formulae is minimal.

23. A method of measuring a spectral irradiance distribution according to claim 7, further comprising:

preparing a plurality of sets of said predetermined spectral irradiance distributions;

calculating said spectral irradiance distributions of the light respectively using the prepared plural sets of spectral irradiance distributions; and selecting, among a plurality of the calculated spectral irradiance distributions of light, one spectral irradiance distribution whose error in said linear formulae is minimal.

24. A method of measuring a spectral irradiance distribution according to claim 8, further comprising:

preparing a plurality of sets of said predetermined spectral irradiance distributions;

calculating said spectral irradiance distributions of the light respectively using the prepared plural sets of spectral irradiance distributions; and selecting, among a plurality of the calculated spectral irradiance distributions of light, one spectral irradiance distribution whose error in said linear formulae is minimal.

25. A method of measuring a spectral irradiance distribution according to claim 1, wherein:

said light-transit selection is a reflector which reflects the light;

said optical characteristic coefficient is a spectral reflectance of said reflector; and said responses for the light reflected from said reflector is detected by said optical sensors.

26. A method of measuring a spectral irradiance distribution according to claim 1, wherein:

said light-transit selection is a filter which allows the light to transmit therethrough;

said optical characteristic coefficient is a spectral transmittance of said filter; and said responses for the light transmitted through said filter is detected by said optical sensors.

27. An apparatus for measuring a spectral irradiance distribution of light, comprising:

(a) an natural number of a light-transit sections to which the light is to be irradiated, each of said n light-transit sections respectively having a different given optical characteristic coefficient;

(b) a natural number s of optical sensors for detecting individual responses for the light received via said n light-transit sections, each of said s optical sensors respectively having a different spectral sensitivity; and (c) a calculating section for calculating a natural number m of spectral irradiances for each and everyone of m kinds of wavelengths as a spectral irradiance distribution of the light based on one or more linear formulae established between said optical characteristic coefficients, said spectral sensitivities, n×s responses for the light obtained by said s optical sensors, and said spectral irradiance distribution.

28. An apparatus for measuring a spectral irradiance distribution of light according to claim 27, wherein:

said optical sensors and said light-transit sections are arranged in such a manner that the number n×s of said responses for the light detected by said optical sensors is equal to or larger than the number m of said spectral irradiances to be calculated based on said linear formulae; and said calculating section calculates said m spectral irradiances by directly solving said linear formulae.

29. An apparatus for measuring a spectral irradiance distribution of light according to claim 27, wherein:

said optical sensors and said light-transit sections are arranged in such a manner that the number n×s of said responses for the light detected by said optical sensors is smaller than the number m of said spectral irradiances to be calculated based on said linear formulae; and said calculating section calculates said m spectral irradiances by solving said linear formulae under a predetermined constraint.

30. An apparatus for measuring a spectral irradiance distribution according to claim 29, wherein said predetermined constraint is such that said spectral irradiance distribution of the light is a positive value.

31. An apparatus for measuring a spectral irradiance distribution according to claim 29, wherein said predetermined constraint is such that said spectral irradiance distribution of the light is expressed by a linear combination of predetermined spectral irradiance distributions.

32. An apparatus for measuring a spectral irradiance distribution according to claim 30, wherein said predetermined constraint is such that said spectral irradiance distribution of the light is expressed by a linear combination of predetermined spectral irradiance distributions.

33. An apparatus for measuring a spectral irradiance distribution according to claim 31, wherein another constraint is added to said predetermined constraint, said another constraint being such that:

said spectral irradiance distribution of the light is a positive value; and said spectral irradiance distribution of the light is expressed by linearly combining said predetermined spectral irradiance distribution with a non-negative coefficient.

34. An apparatus for measuring a spectral irradiance distribution according to claim 32, wherein another constraint is added to said predetermined constraint, said another constraint being such that:

said spectral irradiance distribution of the light is a positive value; and said spectral irradiance distribution of the light is expressed by linearly combining said predetermined spectral irradiance distribution with a non-negative coefficient.

35. An apparatus for measuring a spectral irradiance distribution according to claim 31, wherein said predetermined spectral irradiance distribution is a principal component of estimated spectral irradiance distributions of one or more light sources.

36. An apparatus for measuring a spectral irradiance distribution according to claim 32, wherein said predetermined spectral irradiance distribution is a principal component of estimated spectral irradiance distributions of one or more light sources.

37. An apparatus for measuring a spectral irradiance distribution according to claim 33, wherein said predetermined spectral irradiance distribution is a principal component of estimated spectral irradiance distributions of one or more light sources.

38. An apparatus for measuring a spectral irradiance distribution according to claim 34, wherein said predetermined spectral irradiance distribution is a principal component of estimated spectral irradiance distributions of one or more light sources.

39. An apparatus for measuring a spectral irradiance distribution according to claim 31, wherein said predetermined spectral irradiance distribution is a linear combination with principal components of estimated spectral irradiance distributions of one or more light sources.

40. An apparatus for measuring a spectral irradiance distribution according to claim 32, wherein said predetermined spectral irradiance distribution is a linear combination with principal components of estimated spectral irradiance distributions of one or more light sources.

41. An apparatus for measuring a spectral irradiance distribution according to claim 33, wherein said predetermined spectral irradiance distribution is a linear combination with principal components of estimated spectral irradiance distributions of one or more light sources.

42. An apparatus for measuring a spectral irradiance distribution according to claim 34, wherein said predetermined spectral irradiance distribution is a linear combination with principal components of estimated spectral irradiance distributions of one or more light sources.

43. An apparatus for measuring a spectral irradiance distribution according to claim 31, wherein said predetermined spectral irradiance distribution is an estimated spectral irradiance of a light source.

44. An apparatus for measuring a spectral irradiance distribution according to claim 32, wherein said predetermined spectral irradiance distribution is an estimated spectral irradiance of a light source.

45. An apparatus for measuring a spectral irradiance distribution according to claim 33, wherein said predetermined spectral irradiance distribution is an estimated spectral irradiance of a light source.

46. An apparatus for measuring a spectral irradiance distribution according to claim 34, wherein said predetermined spectral irradiance distribution is an estimated spectral irradiance of a light source.

47. An apparatus for measuring a spectral irradiance distribution according to claim 31, wherein:

a plurality of sets of said predetermined spectral irradiance distributions are prepared;

said calculating section calculates said spectral irradiance distributions of the light respectively using the prepared plural sets of spectral irradiance distributions; and among the calculated plural spectral irradiance distributions of light, one spectral irradiance distribution, whose error in said linear formulae is minimal, is selected.

48. An apparatus for measuring a spectral irradiance distribution according to claim 32, wherein:

a plurality of sets of said predetermined spectral irradiance distributions are prepared;

said calculating section calculates said spectral irradiance distributions of the light respectively using the prepared plural sets of spectral irradiance distributions; and among the calculated plural spectral irradiance distributions of light, one spectral irradiance distribution, whose error in said linear formulae is minimal, is selected.

49. An apparatus for measuring a spectral irradiance distribution according to claim 33, wherein:

a plurality of sets of said predetermined spectral irradiance distributions are prepared;

said calculating section calculates said spectral irradiance distributions of the light respectively using the prepared plural sets of spectral irradiance distributions; and among the calculated plural spectral irradiance distributions of light, one spectral irradiance distribution, whose error in said linear formulae is minimal, is selected.

50. An apparatus for measuring a spectral irradiance distribution according to claim 34, wherein:

a plurality of sets of said predetermined spectral irradiance distributions are prepared;

said calculating section calculates said spectral irradiance distributions of the light respectively using the prepared plural sets of spectral irradiance distributions; and among the calculated plural spectral irradiance distributions of light, one spectral irradiance distribution, whose error in said linear formulae is minimal, is selected.

51. An apparatus for measuring a spectral irradiance distribution according to claim 27, wherein:

said light-transit selection is a reflector which reflects the light;

said optical characteristic coefficient is a spectral reflectance of said reflector; and said optical sensors detects said responses for the light reflected from said reflector.

52. An apparatus for measuring a spectral irradiance distribution according to claim 27, wherein:

said light-transit selection is a filter which allows the light to transmit therethrough;

said optical characteristic coefficient is a spectral transmittance of said filter; and said optical sensors detect said responses for the light transmitted through said filter.

* * * * *